US005623836A

United States Patent [19]
Mrozinsky et al.

[11] Patent Number: 5,623,836
[45] Date of Patent: Apr. 29, 1997

[54] ELECTRONIC REFRIGERATION CONTROL SYSTEM

[75] Inventors: Richard Mrozinsky, Manitowoc; Robert Novak, Sun Prairie, both of Wis.

[73] Assignee: Paragon Electric Company, Inc., Two Rivers, Wis.

[21] Appl. No.: 528,673

[22] Filed: Sep. 14, 1995

[51] Int. Cl.$^6$ .................................................. F25B 49/02
[52] U.S. Cl. .................................. 62/151; 62/230; 62/298
[58] Field of Search .......................... 62/151, 155, 156, 62/126, 127, 129, 230, 234, 298, 299; 236/94

[56]           References Cited

U.S. PATENT DOCUMENTS

| | | | |
|---|---|---|---|
| 3,911,693 | 10/1975 | Seigler et al. | 62/151 |
| 3,946,574 | 3/1976 | Portera | 62/230 X |
| 4,528,821 | 7/1985 | Tershak et al. | 62/155 X |
| 4,646,964 | 3/1987 | Parker et al. | 236/94 X |
| 4,938,027 | 7/1990 | Midlang | 62/155 X |

*Primary Examiner*—Harry B. Tanner
*Attorney, Agent, or Firm*—Foley & Lardner

[57]           ABSTRACT

An electronic refrigeration and defrost control unit includes a compressor relay, a defrost relay, and a fan relay. The compressor relay includes two hot terminals and one neutral terminal, the defrost relay includes three hot terminals and one neutral terminal, and the fan relay includes three hot terminals and one neutral terminal. The terminals are preferably quick connect terminals which eliminate the need for splicing neutral wires together. The electronic refrigeration and defrost control unit preferably includes a processor control circuit for driving an LED display and driving the defrost relay, fan relay and compressor relay. The control circuit is coupled to a power input which includes a super capacitor for storing power in the event of a brown-out or power shortage condition.

20 Claims, 3 Drawing Sheets

5,623,836

ELECTRONIC REFRIGERATION CONTROL SYSTEM

FIELD OF THE INVENTION

The present invention relates generally to refrigeration systems, and more particularly to an electronic refrigeration control system.

BACKGROUND OF THE INVENTION

Electronic refrigeration control systems typically include defrost and temperature control capability. The systems precisely monitor and control (e.g., turn on and off) the compressor, evaporator fan, and defrost devices in response to user specified parameters, temperature, and time. Generally, the user may input user specified parameters by push buttons or keypads attached to the external housing of the refrigeration control system. The user can customize or program the control features of the refrigeration system via the user specified parameters. Additionally, electronic refrigeration control systems often include displays for providing indicia of the operating conditions of the refrigeration unit and time, as well as assisting in the input of user specified parameters.

The electronic refrigeration control system typically includes a control circuit coupled to a defrost relay, an evaporator fan relay, and a compressor relay. The defrost relay connects and disconnects power to a defrost device in response to a defrost control signal. The defrost device can be an electrical heater or a device for causing the compressor to operate in a reverse mode or "hot gas" mode. The evaporator fan relay connects and disconnects power to the evaporator fan in response to an evaporator fan control signal. The compressor relay connects and disconnects power to the compressor in response to a compressor control signal. Therefore, the electronic refrigeration control system manipulates the defrost device, evaporator fan, and compressor via a set of relay switches.

In a conventional electronic refrigeration control system, a control circuit and the various relays are contained in a plastic housing which is bracketed or otherwise mounted in the refrigeration unit. Alternatively, the housing may be a stand-alone unit. Conventional electronic refrigeration control systems utilize a single neutral return for the power provided to the electronic refrigeration control unit, as well as the neutral wire for the defrost relay, compressor relay and fan relay. Typically, the maintenance personnel must splice together all the neutral wires associated with the power input, defrost device, compressor, and evaporator fan, and connect a single neutral wire to the single neutral terminal or electronic refrigeration control housing.

Splicing several neutral wires together adds to the cost of manufacturing the refrigeration unit. Further, such a requirement reduces the reliability and increases the maintenance costs associated with the electronic refrigeration control system particularly when defrost units, compressors and evaporator fans are replaced. For example, if a evaporator fan is replaced, the neutral wire for the fan must be re-spliced with the neutral for the defrost unit and the compressor. Further, a single neutral terminal makes the connection of the fan, compressor and defrost unit more cumbersome and less accessible.

Therefore, there is a need for quick and efficient terminals which allow devices associated with the relays in an electronic refrigeration control system to be easily connected and disconnected without the need to splice neutral wires. Further, there is a need for an arrangement which allows neutral wires to be placed together to avoid short circuiting between hot wires associated with the power input, compressor relay, defrost relay, and fan relay. Further still, there is a need for multiple neutral terminals so neutral wires can be connected to the relays without splicing the neutral wires together from different relays.

SUMMARY OF THE INVENTION

The present invention relates to an electronic refrigeration and defrost temperature control system including a defrost relay, a compressor relay, a fan relay, and a processor. The processor is coupled to the defrost relay, the compressor relay, and the fan relay and provides a defrost control signal to the defrost relay, a compressor control signal to the compressor relay, and a fan control signal to the fan relay in response to a software program including temperature and defrost control criteria. The defrost relay includes a defrost power terminal and a defrost neutral terminal, the compressor relay includes a compressor power terminal and a compressor neutral terminal, and the fan relay includes a fan power terminal and a fan neutral terminal.

The present invention further relates to an electronic control unit for a refrigeration system. The refrigeration system includes a compressor unit, a defrost unit, and a fan unit. The electronic control unit includes multiple defrost line terminals for coupling external hot and neutral wires to the defrost unit, multiple compressor line terminals for coupling external hot and neutral wires to the compressor unit, multiple fan line terminals for coupling external hot neutral wires to the fan unit, user interface means for providing user control parameters, and a processor means. The processor means provides a defrost control signal to the defrost line terminals, a compressor control signal to the compressor line terminals, and a fan control signal to the fan line terminals in response to the user control parameters.

The present invention also relates to an electronic control unit for a refrigeration system. The electronic control unit includes multiple defrost wire terminals, multiple compressor wire terminals, multiple fan wire terminals, a user interface, a display, and a control circuit. The control circuit is coupled to the user interface, the display, the multiple defrost wire terminals, the multiple compressor wire terminals, and the multiple fan wire terminals. The control circuit provides a display signal to the display so that the display provides visual indicia of the operation of the control unit. The control circuit receives user input parameters from the user interface. The control circuit provides a defrost control signal to the defrost wire terminals, a compressor control signal to the compressor wire terminals, and a fan control signal to the fan wire terminals in response to the user input parameters and temperature and defrost control criteria. The wire terminals each include a separate hot terminal and a neutral terminal for coupling to external wires.

In one aspect of the present invention, the electronic refrigeration control system includes at least one neutral terminal for each relay such as the compressor relay, the defrost relay, and the fan relay. The neutral terminals are preferably arranged in a group on the housing of the electronic refrigeration control system. The neutral terminals are arranged to avoid accidental contact with hot terminals from the compressor relay, defrost relay, and fan relay, as well as the hot terminals related to the power input to the electronic refrigeration control system. Three of the neutral terminals are advantageously arranged in a line, each of the three neutral terminals being for connection to one of the neutral of the compressor relay, the defrost relay, and the fan relay, respectively.

In another aspect of the present invention, the refrigeration control system includes five neutral terminals. Two neutral terminals are allocated for use by the power input to the electronic control system, and three neutral terminals are allocated for each of the compressor relay, defrost relay, and fan relay. Additionally, the defrost relay includes three hot terminals, the compressor relay includes two hot terminals, and the fan relay includes three hot terminals. The terminals are preferably quick connect terminals to provide ease of repair and wiring for the electronic refrigeration control system.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EXEMPLARY EMBODIMENT

Figure 1:
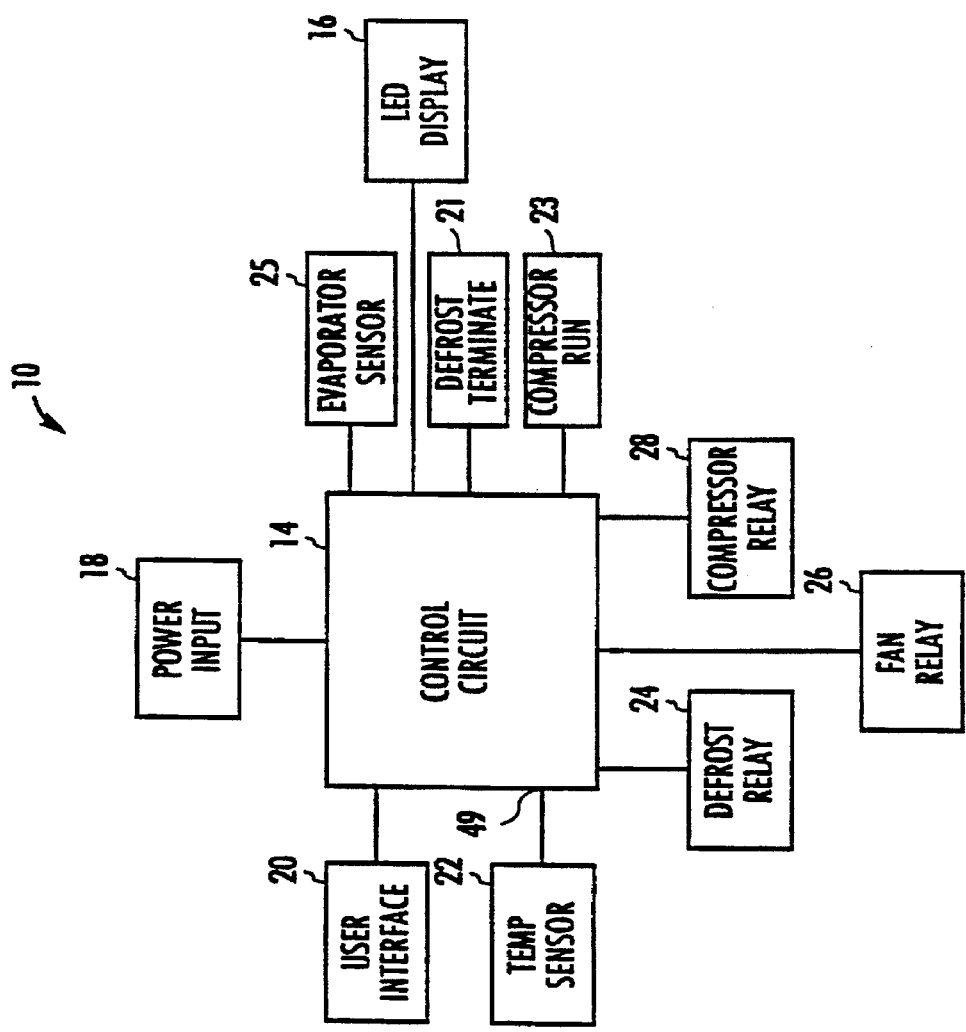
FIG. 1 is a simplified schematic block diagram of a refrigeration control system in accordance with an exemplary embodiment of the present invention.

Referring generally to FIG. 1, an electronic refrigeration and defrost control system 10 includes a control circuit 14, an LED display 16, a power input 18, a user interface 20, a temperature sensor 22, a defrost relay 24, a fan relay 26, and a compressor relay 28. Power input 18 may be configured for 120 VAC, 60 Hz electrical input or 208–240 VAC electrical input. Power input 18 includes circuitry for storing power for use in a power outage or brown-out condition. Power input 18 preferably is able to store a minimum of a four days power outage carryover by use of a super capacitor (not shown in FIG. 1) for maintaining clock functions of circuit 14. Additionally, power input 18 serves to convert the AC power input to a DC voltage for use by control circuit 14.

User interface 20 is preferably a keypad such as a four button type keypad including a run switch, mode switch, advance switch, and enter switch (not shown). User interface 20 allows the user to input various control criteria for the defrost, fan and compressor operations controlled by system 10. Additionally, the user can enter timing data, as well as time of day and date data, for use by control circuit 14. Control circuit 14 preferably keeps track of the time of day and calendar date for automatic daylight savings time and leap year adjustments and automatic defrost and other refrigeration modes in accordance with the control strategy for system 10. The time of day and date can be displayed on LED display 16.

Additionally, temperature sensed by temperature sensor 22 may be displayed on LED display 16. Temperature sensor 22 is preferably a plastic or stainless steel temperature for measuring temperatures between −20° F. to 70° F. and is positioned inside the refrigerator space (not shown) near the evaporator intake (not shown). Sensor 22 provides the temperature signal to a temperature signal input 49.

Control circuit 14 preferably receives the inputs from temperature sensor 22 and user interface 20 to control the operation of the refrigeration unit (not shown). Control circuit 14 precisely monitors the temperature within the refrigeration unit via temperature sensor 22 and the time and controls the compressor, evaporator fan, and defrost device based upon the temperature, user input parameters from user interface 20, and the time of day.

Additionally, control circuit 14 receives defrost termination signal from a defrost termination input 21. Defrost termination input 21 is preferably coupled to a bi-metal temperature sensor such as a Klixon-on™ sensor which provides a temperature signal when the temperature within the refrigeration unit falls below a threshold indicating that the refrigeration unit has been defrosted. Alternatively, other types of temperature sensors may be utilized. Circuit 14 preferably provides control signals to relays 24, 26 and 28 so system 10 returns to a normal operation mode in response to the defrost termination signal.

Control circuit 14 also receives a compressor signal from a compressor sensor 23 which is coupled to the compressor or a sensor which determines whether the compressor is operating. An evaporator temperature signal at an evaporator sensor input 43. Preferably, the evaporator sensor (not shown) is located in an evaporator compartment in the refrigeration unit and is a device similar to temperature sensor 22. Control circuit 14 can be programmed to respond to the defrost termination signal, the compressor signal and evaporator fan signal by providing error warnings on display 10, changing the mode of operation for system 10 or otherwise manipulating relays 24, 26 and 28.

Control circuit 14 preferably maintains the temperature within the refrigerator unit within 1° C. For example, if the temperature in the refrigerator unit rises above a threshold, control circuit 14 will provide a control signal through compressor relay 28 so that the compressor is turned ON and the temperature in the refrigeration unit is decreased. Similarly, if the temperature falls below the threshold, control circuit 14 provides a compressor control signal to compressor relay 28 so that the compressor is turned off.

Additionally, in a defrost mode, control circuit 14 manipulates relays 24, 26 and 28 to lower the temperature in the refrigeration unit and thereby defrost the refrigeration unit. For example, circuit 14 provides a defrost control signal to defrost relay 24 so a defrost device in the refrigeration unit appropriately defrosts the refrigeration unit. The defrost device can cause a "hot gas" defrost operation via the compressor or be an electric coil for heating the interior of the refrigeration unit. In the defrost mode, circuit 14 also provides an evaporator fan control signal to fan relay 26 so the evaporator fan is turned OFF. In the defrost mode, circuit 14 further provides the compressor control signal to compressor relay 28 so the compressor is turned OFF.

Control circuit 14 can provide selective pump-down periods for the compressor, evaporator fan delays, and defrost drain periods via user interface 20. For example, circuit 14 may implement delays for the operation of the evaporator fan and the compressor to prevent hot air from being blown into the refrigeration unit after the defrost operation is completed and to provide short cycle protection so the compressor is not turned back on too quickly. Additionally, control circuit 14 can provide automatic defrost mode periods on particular hours or days of the week so that the refrigeration unit is automatically defrosted and returned to the normal mode of operation. The length of time for the defrost period may also be user selectable through user interface 20. Further, a user can provide a defrost override signal via user interface 20 which returns the operation of system 10 to the normal mode. Power input 18 and control circuit 14 also ensure that the compressor unit is turned off if the power provided in power input 18 falls below 80% of the nominal line voltage in order to provide brown-out protection.

Figure 2:
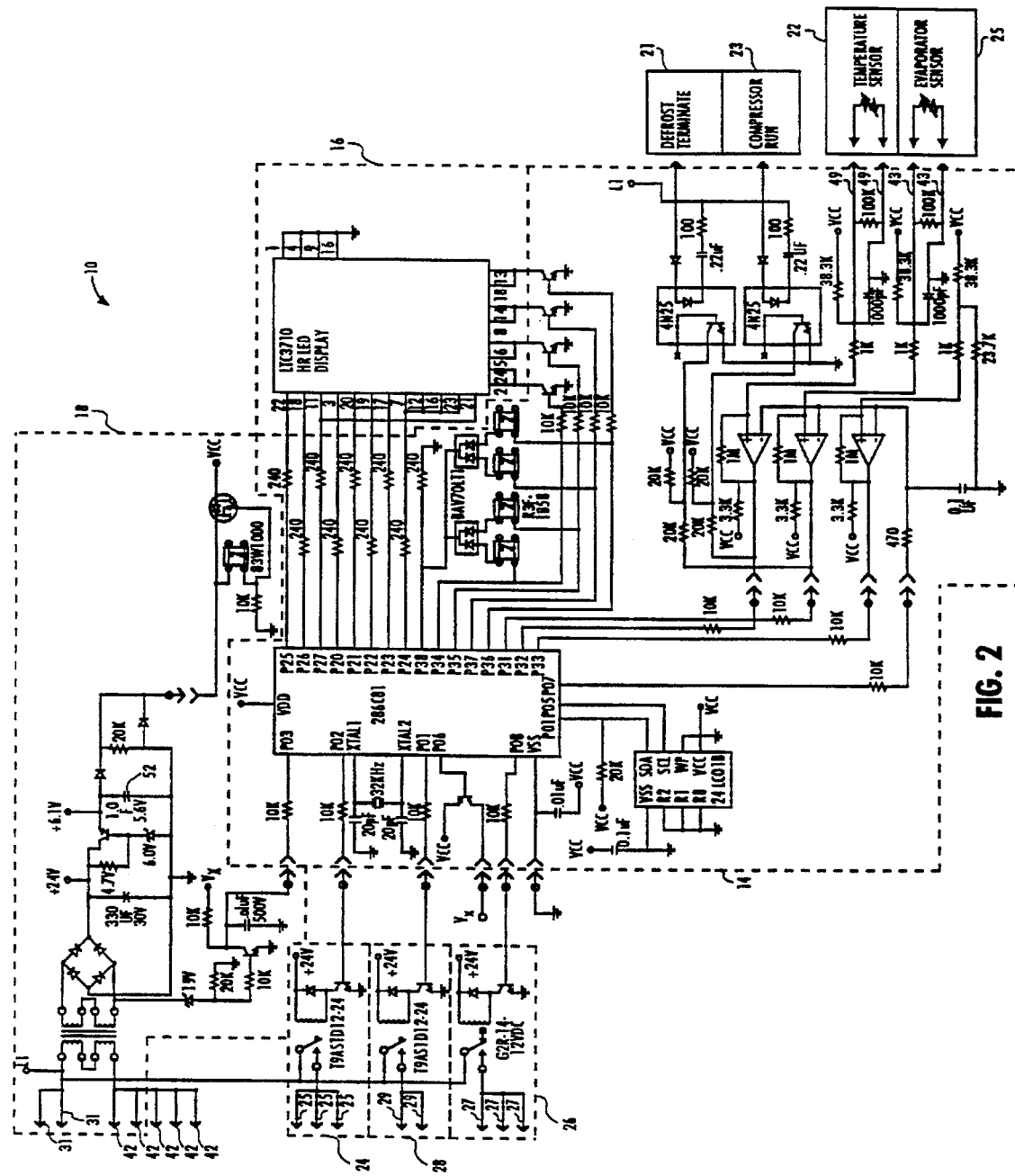
FIG. 2 is an electrical schematic drawing of the electronic refrigeration control system illustrated in FIG. 1.

With reference to FIG. 2, an electrical schematic diagram shows refrigeration control circuit 10. Power input 18 is coupled to a hot line input at terminals 31 and a neutral line input at neutral terminals 42. Power input 18 includes a super capacitor 52 for storing power in the event of a power outage or other failure. Defrost relay 24 is preferably a single-pole, single-throw, normally open, 30 amp resistive relay at 120–240 VAC. Fan relay 26 is preferably a single-pole, single-throw, normally closed, 10 amp resistive relay at 120–240 VAC for ¼ horsepower at 120 VAC and ⅓ horsepower at 208–240 VAC. Compressor relay 28 is preferably a single-pole, single-throw, normally open, ¾ horsepower at 120 VAC/1½ horsepower at 208–240 VAC relay.

Relay 24 includes three hot terminals 25 coupled directly to hot terminals 31. Relay 28 includes two hot terminals 29 coupled directly to hot terminals 31, and relay 26 includes three hot terminals 27 coupled directly to hot terminals 31. Five neutral terminals 42 are included. Neutral terminals 42 as well as terminals 25, 27, 29 and 31 are preferably quick connect terminals dimensioned ¼ inch by 0.032 inches, which provide easy access for wiring external wires between electronic refrigeration control system 10 and the compressor unit, defrost unit, and fan.

Preferred values and connections for the various components and circuitry in FIG. 2 are shown in an exemplary fashion. The operation of the circuitry shown in FIG. 2 is readily understandable to one of ordinary skill in the art having reference to FIG. 2. Various component values and circuitry may be changed without departing from the scope of the invention.

A processor 61 in circuit 14 preferably is programmed in software or firmware to implement various refrigeration and defrost control functions via relays 24, 26 and 28. Processor 61 is programmed to provide manual and automatic defrost operations, clock and timing functions, normal mode temperature control operations, as well as other refrigeration control functions.

Figure 4:
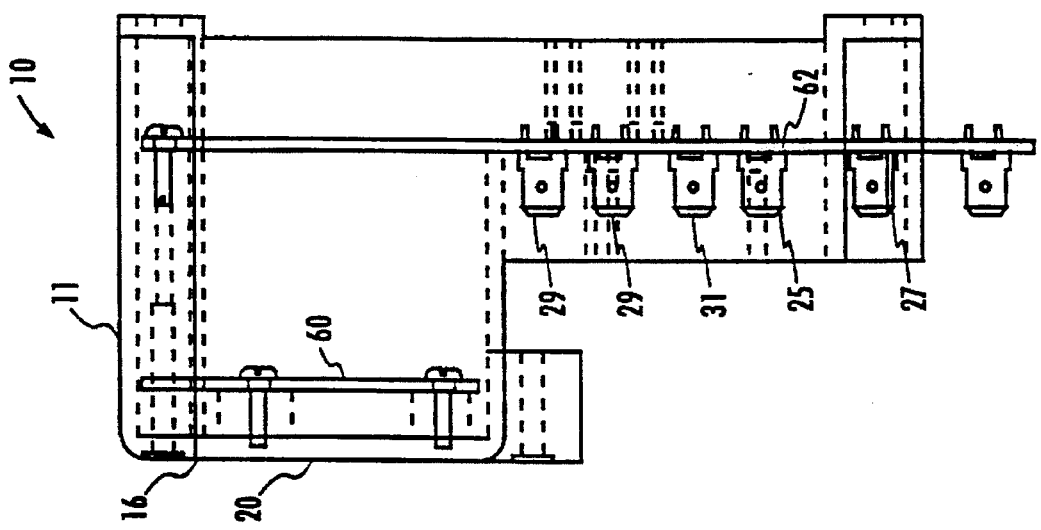
FIG. 4 is a side view of the housing for the electronic refrigeration control system illustrated in FIG. 3.
Figure 3:
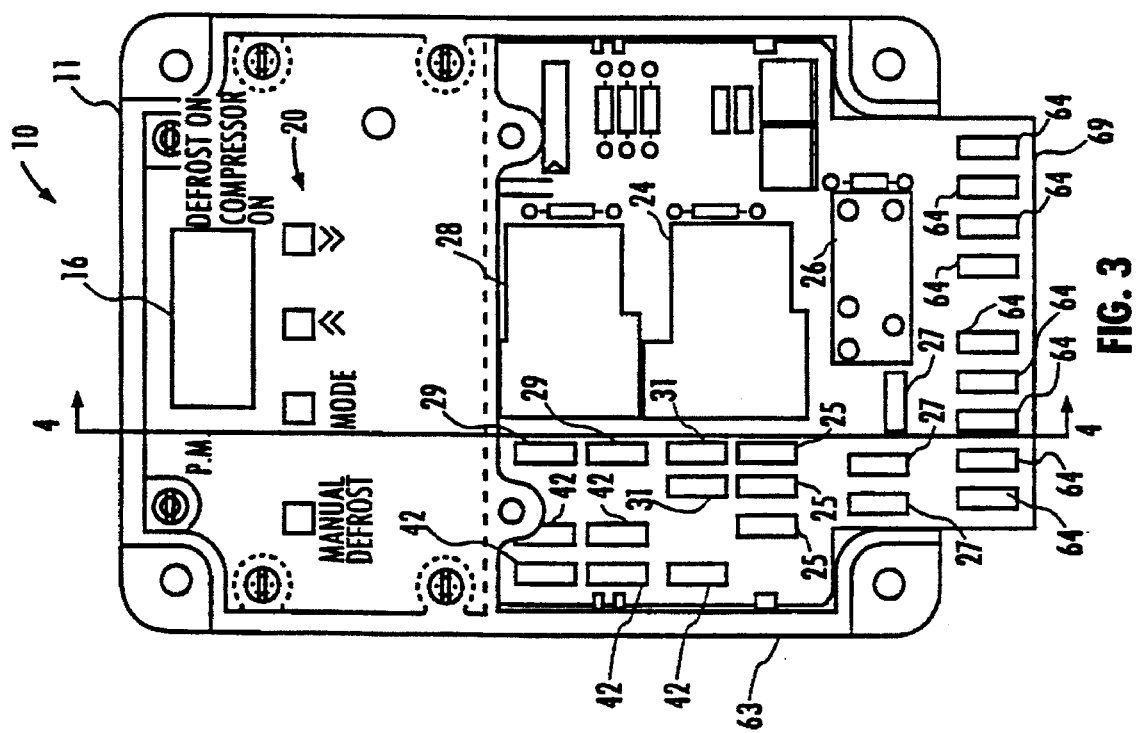
FIG. 3 is a top view of a housing for the electronic refrigeration control system illustrated in FIG. 1.

With reference to FIGS. 3 and 4, a housing 11 stores electronic refrigeration control system 10. Housing 11 is preferably a NEMA-3L plastic enclosure, NEMA-1 metal enclosure, or other housing readily usable in a refrigeration unit. Housing 11 mounts the circuitry associated with display 16 and the majority of the circuitry associated with control circuit 14 on a top circuit board 60. The circuitry associated with defrost relay 24, fan relay 26, compressor relay 28, neutral terminals 42, power input 18, hot terminals 25, hot terminals 27, and hot terminals 29 are located on a bottom circuit board 62. Board 62 further includes auxiliary terminals 64.

Neutral terminals 42 are arranged in a group of five terminals, three in one row and two in another row on board 62 near a side 63 of housing 11. Preferably, neutral terminals 42 are spaced apart from hot terminals 25, 27, 29, and 31. Two neutral terminals are preferably allocated for use with hot terminals 31, one neutral terminal is allocated for compressor relay 28, one neutral terminal is allocated for defrost relay 24, and one neutral terminal 42 is allocated for fan relay 26. For convenience, two hot terminals 29 for compressor relay 28 are located together, three hot terminals 25 for defrost relay 24 are located together, and three hot terminals 27 for fan relay 26 are located together. Auxiliary terminals 64 are preferably located in a row at an end 69 of board 62.

It will be understood that while the various conductors and connectors may be depicted in the drawings as single lines, they are not shown in a limiting sense as understood in the art. Further, the above description is of preferred exemplary embodiments of the present invention and the invention is not limited to the specific form shown. For example, while control circuit 14 is shown having particular component values and interconnections, the invention is not limited to the particular and specific circuitry in FIG. 2. In addition, the orientation of neutral terminals 27 may be adjusted without departing from the scope of the present invention. These and other modifications may be made in the design and arrangement of the elements discussed herein without departing from the scope of the invention as expressed in the appended claims.

We claim:

1. An electronic refrigeration and defrost temperature control system, comprising:

a defrost relay including a defrost power terminal and a defrost neutral terminal;

a compressor relay including a compressor power terminal and compressor neutral terminal;

a fan relay including a fan power terminal and a fan neutral terminal;

a processor coupled to the defrost relay, the compressor relay, and the fan relay, the processor providing a defrost control signal to the fan relay, a compressor control signal to the compressor defrost relay, and a fan control signal to the fan relay in response to a software program including temperature and defrost control criteria; and a housing supporting the defrost relay, the compressor relay, the fan relay, and the processor, the housing having an external surface, wherein the defrost neutral terminal, the compressor neutral terminal, and the fan relay neutral terminal are arranged in a group on the external surface spaced apart from the defrost power terminal, the compressor power terminal, and the fan power terminals, and wherein the defrost power terminal, the compressor power terminal, and the fan power terminal are located on the external surface.

2. The control system of claim 1, wherein the defrost relay, the compressor relay, and the fan relay are each single-pole, single-throw relay switches.

3. The control system of claim 1, wherein the terminals are quick connect terminals and the group is linearly arranged at an edge of the housing.

4. The system of claim 1, further comprising;

a user interface coupled to the processor wherein the defrost and temperature control criteria includes user parameters provided by the user interface.

5. The system of claim 1, further comprising:

a brown-out circuit coupled to the processor, the brown-out circuit disabling the compressor control signal in response to a brown-out condition.

6. The system of claim 1, further comprising:

a power storing capacitor coupled to the processor, the capacitor providing power to the processor in response to a power outage.

7. An electronic control unit for a refrigeration system, the refrigeration system including a compressor unit, a defrost unit, and a fan unit, the electronic control unit comprising;

multiple defrost line terminals for coupling external hot and neutral wires to the defrost unit;

multiple compressor line terminals for coupling external hot and neutral wires to the compressor unit;

multiple fan line terminals for coupling external hot and neutral wires to the fan unit;

user interface means for providing user control parameters;

a processor means for providing a defrost control signal to the defrost line terminals, a compressor control signal to the compressor line terminals, and a fan control signal to the fan line terminals in response to the user control parameters; and a container including a first circuit board at a first level housing the processor mean and a second circuit board at a first second level housing the defrost line terminals and the fan line terminals wherein the defrost line terminals, the compressor line terminals, and fan line terminals protrude through an external surface of the container, and wherein a first group of the terminals for the neutral wires are located together on the second circuit board and separate from second group of the terminals for the hot wires.

8. The control unit of claim 7, wherein the defrost line terminals, the compressor line terminals, and the fan line terminals each include a single-pole, single-throw relay switch.

9. The control unit of claim 7, wherein the terminals are quick connect terminals and wherein the first group is arranged in a line.

10. The control unit of claim 7, further comprising:

a display coupled to the processor means.

11. The control unit of claim 7, further comprising:

a brown-out circuit coupled to the processor means, the brown-out circuit disabling the compressor control signal in response to the brown-out condition.

12. The control unit of claim 7, further comprising:

a power storing capacitor coupled to the processor, the capacitor providing power to the processor in response to a power outage.

13. The control unit of claim 7, wherein the processor means includes a non-volatile memory means for storing criteria related to defrost and temperature control.

14. The control unit of claim 13, wherein the control unit is coupleable to a temperature sensor means for providing a temperature to the processor means.

15. The control unit of claim 10, wherein the display is an LED display.

16. An electronic control unit for a refrigeration system, the electronic control unit comprising;

multiple defrost wire terminals;

multiple compressor wire terminals;

multiple fan wire terminals;

a user interface;

a display;

a control circuit coupled to the user interface, the display, the multiple defrost wire terminals, multiple compressor wire terminals, and multiple fan wire terminals, the control circuit providing a display signal to the display so that the display provides visual indicia of operation of the control unit, the control circuit receiving user input parameters from the user interface, the control circuit providing a defrost control signal to the defrost wire terminals, a compressor control signal to the compressor wire terminals, and a fan control signal to the fan wire terminals in response to the user input parameters and temperature and defrost control criteria, wherein the wire terminals each include a separate hot terminal and neutral terminal for coupling to external wires;

and an enclosure supporting the defrost wire terminals, the compressor wire terminals, the fan wire terminals, the user interface, the display, and the control circuit, wherein the neutral terminal for each of the fan wire terminals, the defrost wire terminals, and the compressor wire terminals are grouped together and separate from the hot terminal for each of the fan wire terminals, compressor wire terminals, and defrost wire terminals, the neutral terminal for each of the defrost wire terminals, fan wire terminals, and compressor wire terminals protrude through the enclosure.

17. The control unit of claim 16, wherein the defrost wire terminals, the compressor wire terminals, and the fan wire terminals are each coupled to a single-pole, single-throw relay switch.

18. The control unit of claim 16, wherein the terminals are quick connect terminals.

19. The control unit of claim 17, wherein the defrost wire terminals, the compressor wire terminals, and the fan wire terminals each include at least two hot terminals.

20. The control unit of claim 16, wherein the control criteria includes timing data.

* * * * *